United States Patent [19]

Lamparter et al.

[11] Patent Number: 4,877,266
[45] Date of Patent: Oct. 31, 1989

[54] VEHICLE SAFETY SYSTEM

[75] Inventors: Ronald C. Lamparter, Grosse Pointe Shores; Robert J. Brown, Troy, both of Mich.

[73] Assignee: Transpec Inc., Troy, Mich.

[21] Appl. No.: 270,943

[22] Filed: Nov. 14, 1988

[51] Int. Cl.4 .................................. B60R 13/04
[52] U.S. Cl. ................................ 280/762; 280/768; 293/118
[58] Field of Search ............. 280/762, 768, 848, 154, 280/849; 180/274, 279; 293/15, 16, 34, 37, 118, 127, 128

[56] References Cited

U.S. PATENT DOCUMENTS

| 4,582,351 | 4/1986 | Edwards | 293/118 |
| 4,688,656 | 8/1987 | Kent | 180/279 |
| 4,688,824 | 8/1987 | Herring | 280/762 |

*Primary Examiner*—Charles A. Marmor
*Assistant Examiner*—Richard Camby

[57] ABSTRACT

The invention relates to a vehicle safety device wherein the device is pivotally mounted along the lower edge of the vehicle body such that the device may be stored beneath the body when the vehicle is moving and lowered through a pivoting action to block the space between the vehicle body and the ground and in being lowered tends to engage and sweep any object in its path from beneath the vehicle and outwardly of the vehicle wheels.

5 Claims, 2 Drawing Sheets

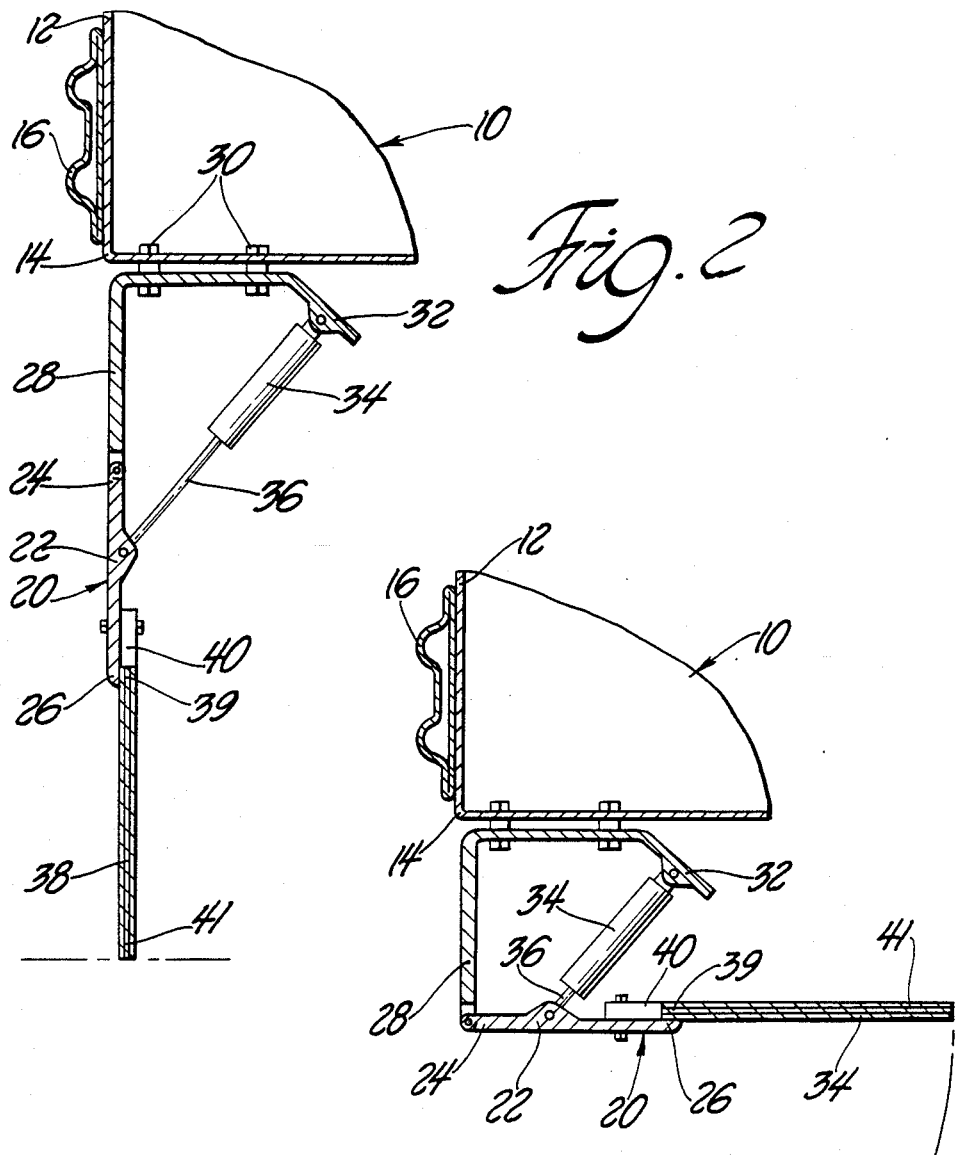

VEHICLE SAFETY SYSTEM

BACKGROUND OF THE INVENTION

The present invention relates to a safety system for vehicles seeking to prevent people from crawling beneath a vehicle and being injured when the vehicle starts up. This is a particularly serious problem with school buses where children get beneath the vehicle after the same has stopped and before it starts up again. Hundreds of children are injured or killed each year due to their dashing beneath a stopped school bus without the knowledge of the operator.

Various safety systems have been designed to avoid this problem and several will be hereinafter referred to. Applicant has developed a new and simplified system addressing the problem of reducing the likelihood of an individual getting beneath a vehicle which comes to a stop and further which avoids some of the disadvantages of prior art devices.

PRIOR ART

The closest prior art of which applicant is aware are U.S. Pat. Nos. 4,688,656 Kent and 4,688,824 Herring. In common, both of these prior art patents involve systems which vertically drop blocking members down from the vehicle body with the objective of preventing, for instance, a child crawling under the bus. Both of these devices have the disadvantage that by virtue of the vertical dropping down of the blocking mechanisms, such devices can, in fact, pinon a child beneath the blocking mechanism as such descends toward the ground. In such case, the child could have difficulty in extricating himself from beneath the vehicle. In another scenario, these blocking devices could in and of themselves cause an injury to a child in the same manner as lowering a window on a child could have.

SUMMARY OF THE INVENTION

Applicant has created a system which eliminates the guillotine or vertically lowering movement and, instead, provides a system which is pivotally mounted upon the vehicle body in such a way as to sweep a child or other object outwardly away from underneath the vehicle as it is lowered into its protective position.

More specifically, the subject invention relates to a vehicle safety system of the type wherein the vehicle includes a body having a lower edge portion disposed about the periphery of the body. The system includes a device suitably secured beneath the vehicle body and adapted to be lowered to substantially fill the space between the lower edge of the vehicle body and the ground. A mechanism is provided for selectively raising and lowering said device as needed. Applicant's improvement includes a flat and rigid beam member which extends along said body edge and includes upper and lower edges generally parallel to the lower edge of the vehicle body. A hinge means pivotally connects the upper edge of the beam to the body proximate the lower edge thereof. A flexible means is provided and is secured at its upper portion to the bottom or lower edge of the beam. The operating mechanism is connected to the beam member in such a way that the flexible means is adapted to engage an object and tend to sweep it from beneath the vehicle as the device is pivotally lowered from a retracted position beneath the vehicle body to its vertical or blocking position.

Thus, it is the object of the present invention to provide a system for preventing a person or an object from getting beneath a vehicle and does so in a way as to minimize the possibility of injuring either the person or object.

The means by which the above object and advantages of the invention are realized will be clearly understood from the following description of a preferred embodiment thereof selected for the purposes of illustration, having reference to the drawing, wherein:

BRIEF DESCRIPTION OF THE DRAWINGS

FIG. 2 is a view along line 2—2 of FIG. 1.

FIG. 3 shows the mechanism in a retracted position beneath the body of the vehicle.

DESCRIPTION OF PREFERRED EMBODIMENT

Figure 1:
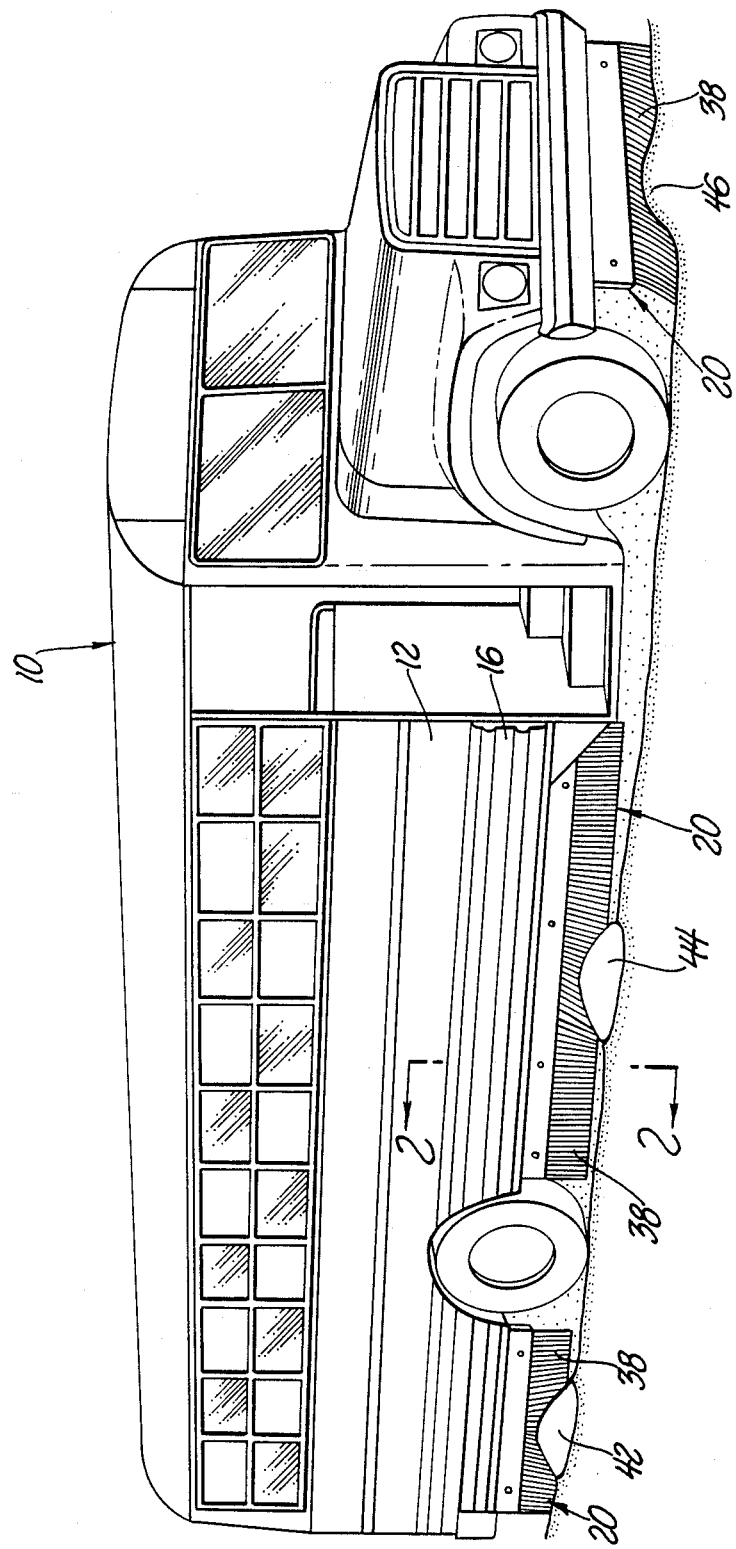
FIG. 1 shows the invention as mounted on a school bus and in its descended or operative position.

While the subject invention may be applied to various types of vehicles, it is particularly intended for use with school buses where the incidents of injuries due to children crawling beneath the bus is hiqh. Thus, a school bus is indicated generally at (10) and includes a side wall or panel (12) which terminates at the lower end in an edge portion (14) vertically spaced above the ground.

A rubber-like scuff panel (16) is mounted on panel (12). On most school buses the space between the edge (14) of body side wall (12) to the ground is frequently in excess of two feet and, in any case, it is quite easy for a child or large object to get beneath the vehicle. While waiting for school buses and on other occasions around such vehicles, children frequently play with balls which come loose and often roll beneath the school bus. It is not uncommon that a child attempts to retrieve such ball or other object from beneath a stopped bus and may thus be caught beneath the vehicle when it starts up frequently resulting in serious injury or death. As noted earlier in the application, various prior art devices have been developed in an effort to prevent a child or object from getting beneath the bus when it is stopped. It is applicant's view that some of these safety devices have themselves certain dangerous aspects in that by vertically descending they can either trap a child between the device and the ground or such device can hit an impediment in such a way as to preclude its continued descending thus leaving the space below the vehicle unblocked. Applicant's device avoids these problems by providing a sweeping descending motion rather than a vertical descent and also by providing a flexible lower skirt portion which can adapt to the form of an object without preventing the remainder of the skirt from blocking the open space beneath the bus.

Applicant's retractable safety or guard device is indicated generally at (20). As best seen in FIGS. 2 and 3, device (20) includes a rigid flat beam member (22) which includes upper and lower edges (24) and (26) extending generally parallel to bottom edge (14) of body panel (22). Beam (22) is pivotally supported to the vehicle body through a suitable bracket member (28) which is suitably bolted or otherwise fixed to the bottom of body as through bolt members (30). An inner flange (32) of bracket (28) also supports a suitable actuating mechanism such as a piston (34) and rod (36) adapted to be remotely controlled by the vehicle operator or by some other automatic system to actuate device (20).

When in the vertical position as shown in FIG. 2 beam (22) only partially encloses the space between the vehicle body and the ground. Accordingly, a flexible member (38) is suitably fixed proximate the lower edge portion (26) of beam (22). In the preferred embodiment of the invention, flexible member (38) is comprised of a plurality of individually joined flexible elements clamped at their upper ends (39) to beam (22) by a rigid bar (40) such that the flexible elements are in longitudinally abutting relationships while having their bottom ends (41) free to move relative to each other and to an immovable object which might be engaged. The elements comprising members (38) can be like the tines in a rake or comb or can be like the bristles of a brush or a broom. While member (38) is flexible, it should have sufficient rigidity to remain in a generally coplanar or aligned relationship with beam (22) when the beam is in its retracted position as shown in FIG. 3.

While not shown, it is also possible that flexible member (38) could be a flexible sheet of rubber or plastic wherein the lower edge has sufficient flexibility to adapt and conform around immovable objects on the ground such as illustrated at (42), (44) or (46) in FIG. 1 of the drawings.

Returning to the preferred modification shown in the drawings, FIG. 3 illustrates the safety device (20) in its retracted position beneath the vehicle body. This is the position of the device when the vehicle is moving. On the other hand, in the position shown in FIG. 2 device (20) is in its downward or protecting position when the vehicle is stopped and when there is any likelihood of a child or object moving beneath the bus. In the position shown in FIG. 2, beam member (22) is in a vertical position and generally coplanar with the outer surface of the body side panel (12). Flexible member (38) is likewise in an essentially vertical position when the safety device is in its down or protecting position.

The pivoting or sweeping action of device (20) as it moves from its retracted position shown in FIG. 3 to the downward or protecting position shown in FIG. 2 is a most important aspect of the present invention. The importance of this sweeping or pivoting action is that should a movable object or a child begin to move beneath the bus as it stops, the pivoting, descending action of the device (20) will sweep the object or child away from beneath the bus and away from the vehicle wheels. In this manner the child or object will not itself be trapped by the safety device as is possible with prior art systems.

Likewise, inasmuch as the lower ends of the flexible member (38) or its constituent elements are free to move relative to each other, they can adapt to immovable objects which might be engaged as the device is moving to its protective or down position as shown in FIG. 1. In other words, the fexible member (38) can adapt to the shape of immovable objects engaged such as (42), (44) or (46) without affecting the closing or sealing action of the remaining portions of the flexible member. Again, prior art devices use rigid rod or beam members at their bottom edges which can either pinion or trap an object or child between the rod or beam and the ground or can prevent the device from reaching its fully closed or protective position.

As best seen in FIG. 1, device (20) can be installed on all portions of the bus or vehicle which need to be blocked to prevent undesired entry of an object or child.

The actuating piston (34) can be controlled in a variety of ways. It can be controlled by the operator actuating a switch to lower and raise the device or automatically operated in response to the application of the vehicle brakes or by the stopping of movement of the vehicle. In any case, the system should be actuated to lower device (20) when the vehicle is stopped and children are either boarding or unboarding with respect to the vehicle.

It is obvious that other modifications of the invention are possible within the intended scope of the invention as set forth in the hereinafter appended claims.

What is claimed is:

1. A vehicle safety device of the type wherein the vehicle includes a body (10) having a side panel (12) with a lower edge portion (14) disposed about the periphery of the body, a device secured to the body and adapted to be lowered to substantially fill the space between the lower edge of the body and the ground, and a mechanism (34–36) for selectively raising and lowering said device, the improvement wherein said device includes
   a. a rigid beam member (22) extending along said body edge, said member having upper and lower edge portion (24 and 26) qenerally parallel to the lower edge (14) of the body;
   b. bracket means (28) pivotally supporting the upper edge portion (24) of the beam to the body proximate the lower edge (14) thereof,
   c. flexible means (38) including upper and lower portions (39 and 41),
   d. means (40) containing and securing the upper portion of the flexible means to the lower edge portion (26) of said beam member (22), said mechanism (34–36) being operatively connected to said beam member (22) and to a inner flange (32) of the bracket means (28) such that the flexible means is adapted to engage an object and tend to sweep it from beneath the vehicle as the device is pivotally lowered from a retracted position.

2. A vehicle safety system as set forth in claim wherein the flexible means includes a plurality of closely positioned flexible elements secured at their upper ends (39) by containing means (40) and generally aligned with the beam member (22).

3. A vehicle safety system as set forth in claim 2 wherein the uncontained ends of the flexible elements are free to move relative to each other.

4. A vehicle safety system as set forth in claim wherein the beam member (22) is generally vertically aligned with the side panel (12) of the vehicle body when the device (20) is in its downward position.

5. A vehicle safety system as set forth in claim 1 wherein the flexible means (38) has sufficient rigidity to maintain a generally coplanar relationship to beam (22) when the beam is in a retracted position beneath the vehicle body.

* * * * *